(No Model.)
G. L. ARMBRISTER.
PLANTER AND FERTILIZER DISTRIBUTER.
No. 418,485. Patented Dec. 31, 1889.
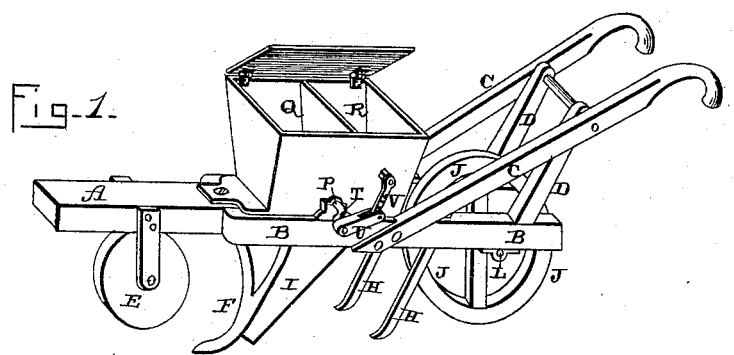
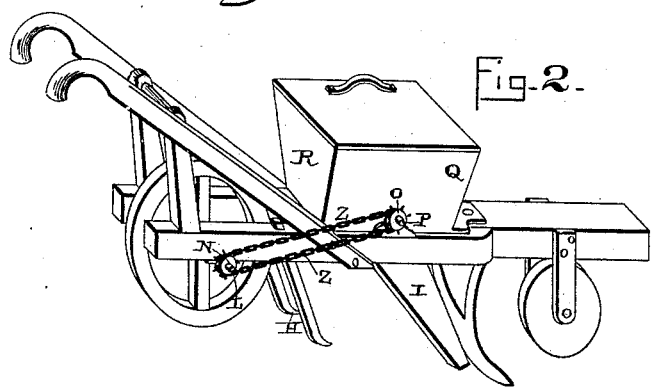
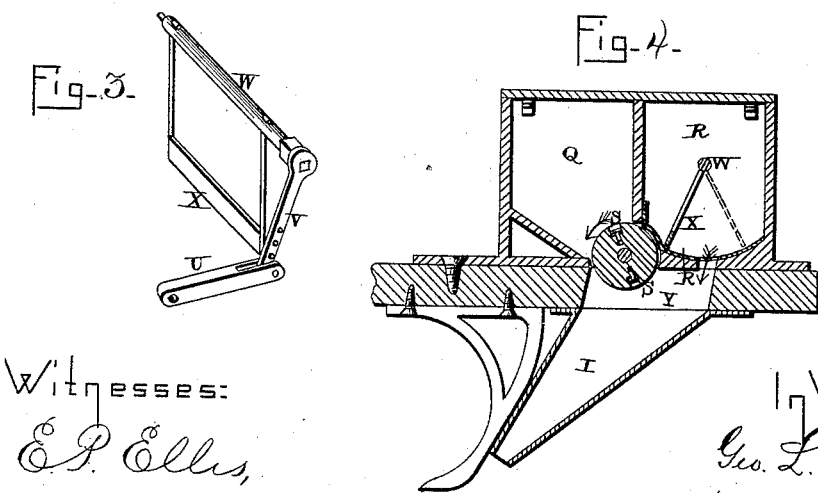
Witnesses:
E. P. Ellis,
J. M. Nesbit.
Inventor:
Geo. L. Armbrister,
per
F. A. Lehmann,
Atty.

UNITED STATES PATENT OFFICE.

GEORGE LEE ARMBRISTER, OF RED BLUFF, VIRGINIA.

PLANTER AND FERTILIZER-DISTRIBUTER.

SPECIFICATION forming part of Letters Patent No. 418,485, dated December 31, 1889.

Application filed August 20, 1889. Serial No. 321,391. (No model.)

*To all whom it may concern:*

Be it known that I, GEORGE LEE ARMBRISTER, of Red Bluff, in the county of Wythe and State of Virginia, have invented certain new and useful Improvements in Combined Planters and Fertilizer-Distributers; and I do hereby declare the following to be a full, clear, and exact description of the invention, such as will enable others skilled in the art to which it pertains to make and use it, reference being had to the accompanying drawings, which form part of this specification.

My invention relates to an improvement in combined planters and fertilizer-distributers; and it consists in the arrangement and combination of parts, which will be more fully described hereinafter, and specially pointed out in the claims.

The object of my invention is to provide a combined planter and fertilizer-distributer in which the seed and fertilizer boxes are separated only by a partition and the mechanisms for dropping the fertilizer and planting the seed are operated simultaneously by the rear driving-wheel, and by which the relation of the fertilizer-stirrer to the planter-wheel can be regulated, and thereby the amount of fertilizer that is to pass out with the seed increased or decreased at will.

Figure 1 is a perspective taken from one side of the machine. Fig. 2 is a perspective taken from the opposite side. Fig. 3 is a detached view of the fertilizer-operating device. Fig. 4 is a vertical section of the two feed-boxes detached.

A represents the main beam, which is rigidly secured at its rear end between the two side beams B, from which the handles C and their supports D rise. The front end of the beam A is supported by the wheel E, and secured to the under side of the beam in the rear of the wheel is the furrow-opener F, of any suitable description. Projecting downward from the side beams B in the rear of the furrow-opener F, and upon each side thereof, are the covering devices H, which cover the seeds after having been dropped through the spout I into the furrow which has been opened for them. The rear end of the machine is supported by the wheel J, which is journaled in suitable boxes secured to the under sides of the rear ends of the side beams B, and the shaft L of this wheel is provided with a pionion N at one end, and around this pinion N and the pinion O on the shaft P is passed the endless operating-belt Z. The shaft P is journaled in suitable bearings prepared to receive it upon the top of the front ends of the side beams B, and extends through between the two boxes Q R. Secured to the center of the shaft P is the seed-wheel S, of any suitable construction, and the opposite end of the shaft from the pinion O is provided with the crank T. This shaft may pass through a space between the two boxes Q R or directly through the box Q, as may be preferred. Fastened to the crank T is an adjustable connecting-rod U, which has its other end attached to the crank V upon one end of the shaft W, which extends through the fertilizer-box R. Secured to this shaft W, at or near its center, is the stirring device X, which is caused to reciprocate in the box R by the crank V. The lower edge of this device sweeps back and forth over the concaved bottom of the box R, for the purpose of causing the fertilizer to drop from the opening in the bottom of the box into the spout I. As the amount of fertilizer which passes from the box or hopper R is more or less, according to the amount of movement given to the stirrer X, it can be regulated by means of the adjustable rod U and perforated crank V. The two boxes Q R are placed upon the central beam A near its rear end, and through this beam A is formed a slot Y, through which the seed and fertilizer drop into the spout I below. The openings through the bottom of the boxes or the slot through the beam A may be graduated by means of suitable slides or other well-known devices, so as to regulate the speed at which the seed and fertilizer shall drop into the spout I.

As the machine is moved forward, the wheel J operates the shaft P directly, and the shaft W is operated from this shaft by the connecting-rod U, and thus the grain in the box Q and the fertilizer in the box R are dropped at the same time.

Having thus described my invention, I claim—

In a fertilizer-distributer, the combination of the frame, the driving-wheel and axle journaled in the rear end thereof, a sprocket-wheel upon one end of said axle, a front seed-hopper and a rear fertilizer-hopper adjacent thereto, the shaft P, which passes through the front hopper and provided with a crank at one end, a feed-wheel placed thereon inside of said hopper, a sprocket-wheel on the opposite end of said shaft, a chain engaging the said sprocket-wheels, a shaft W, journaled in the upper portion of said rear hopper, a stirrer placed thereon inside of the hopper, and an adjustable rod which connects the cranks upon the shafts P W, whereby the movement of the stirrer in relation to the feed-wheel is regulated, substantially as shown and described.

In testimony whereof I affix my signature in presence of two witnesses.

GEORGE LEE ARMBRISTER.

Witnesses:
 F. A. GROVE,
 C. D. BLAIR.